United States Patent
Kamikawa et al.

(10) Patent No.: US 12,392,387 B2
(45) Date of Patent: Aug. 19, 2025

(54) ELASTIC UNIT

(71) Applicant: SONY GROUP CORPORATION, Tokyo (JP)

(72) Inventors: Yasuhisa Kamikawa, Tokyo (JP); Hiroki Saijo, Tokyo (JP); Satoko Nagakari, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 635 days.

(21) Appl. No.: 17/294,847

(22) PCT Filed: Oct. 10, 2019

(86) PCT No.: PCT/JP2019/040160
§ 371 (c)(1),
(2) Date: May 18, 2021

(87) PCT Pub. No.: WO2020/110482
PCT Pub. Date: Jun. 4, 2020

(65) Prior Publication Data
US 2022/0018416 A1 Jan. 20, 2022

(30) Foreign Application Priority Data
Nov. 28, 2018 (JP) .................. 2018-222011

(51) Int. Cl.
*F16F 3/04* (2006.01)
*B25J 19/00* (2006.01)
*F16F 7/116* (2006.01)

(52) U.S. Cl.
CPC .................. *F16F 3/04* (2013.01); *B25J 19/00* (2013.01); *F16F 7/116* (2013.01)

(58) Field of Classification Search
CPC .......... F16F 7/116; F16F 3/04; F16F 2230/08; B25J 13/085; B25J 13/088; B25J 19/00; B25J 19/0016
(Continued)

(56) References Cited

U.S. PATENT DOCUMENTS

| | | | | |
|---|---|---|---|---|
| 4,351,515 A | * | 9/1982 | Yoshida ................... | F16F 9/535 267/225 |
| 4,681,303 A | * | 7/1987 | Grassano ................. | B68B 1/00 267/113 |

(Continued)

FOREIGN PATENT DOCUMENTS

| | | |
|---|---|---|
| CN | 101469757 A | 7/2009 |
| CN | 101589245 A | 11/2009 |

(Continued)

OTHER PUBLICATIONS

English machined translation of DE-102009028772 A1, from IDS (description only), Feb. 24, 2011.*

(Continued)

*Primary Examiner* — Robert A. Siconolfi
*Assistant Examiner* — San M Aung
(74) *Attorney, Agent, or Firm* — CHIP LAW GROUP

(57) ABSTRACT

This elastic unit is provided with: a shaft-like member that extends in one direction and that is connected to a force point acted on by an external force; an enclosure member that has an internal space and that is penetrated by the shaft-like member; a bearing that is provided at a point of contact between the shaft-like member and the enclosure member so that the shaft-like member is movable with respect to the enclosure member; a plate member that is provided inside the internal space of the enclosure member so as to protrude from the shaft-like member; and at least (Continued)

one or more elastic members sandwiched between the enclosure member and the plate member.

14 Claims, 11 Drawing Sheets

(58) Field of Classification Search
USPC .......................................................... 267/136
See application file for complete search history.

(56) References Cited

U.S. PATENT DOCUMENTS

| | | | |
|---|---|---|---|
| 5,650,704 A | 7/1997 | Pratt et al. | |
| 5,775,469 A * | 7/1998 | Kang | F16F 15/03 188/162 |
| 9,103,403 B2 * | 8/2015 | Hadden | F16F 15/06 |
| 2003/0030204 A1 | 2/2003 | Chou | |
| 2003/0141641 A1 * | 7/2003 | Adoline | F16F 3/04 267/168 |
| 2012/0286493 A1 * | 11/2012 | Butlin, Jr. | B60G 3/20 188/297 |
| 2014/0005831 A1 * | 1/2014 | Naderer | B25J 11/0065 700/258 |
| 2018/0274618 A1 * | 9/2018 | Ng | F16F 13/005 |
| 2019/0211807 A1 * | 7/2019 | Jindal | F16F 1/128 |

FOREIGN PATENT DOCUMENTS

| | | | | |
|---|---|---|---|---|
| CN | 103429400 A | | 12/2013 | |
| CN | 104196954 A | | 12/2014 | |
| DE | 102009028772 A1 | | 2/2011 | |
| JP | 57-59489 A | | 4/1982 | |
| JP | 8-290383 A | | 11/1996 | |
| JP | H08313372 A | | 11/1996 | |
| JP | 2009-125886 A | | 6/2009 | |
| JP | 2013-002599 A | | 1/2013 | |
| JP | 2014-508051 A | | 4/2014 | |
| KR | 1313385 B1 * | 10/2013 | ............. | E04H 9/027 |
| KR | 101477068 B1 | | 12/2014 | |
| WO | WO-2005118231 A1 * | 12/2005 | .......... | B25J 19/0016 |

OTHER PUBLICATIONS

Yasuhiro Fukuoka; For Yasuhiro Fukuoka and an irregular ground two-legged robot[ a ming transition phenomenon ] Development of the used ** variable sole, 29thProceedings of Symposium of the Robotics Society of Japan DVD-ROM 2011 The 29 th Annual Conference of the Robotics Society of Japan, general incorporated foundation Robotics Society of Japan.

International Search Report and Written Opinion of PCT Application No. PCT/JP2019/040160, issued on Dec. 10, 2019, 09 pages of ISRWO.

Office Action for CN Patent Application No. 201980077041.1, issued on Jul. 1, 2022, 09 pages of English Translation and 08 pages of Office Action.

* cited by examiner

ELASTIC UNIT

CROSS REFERENCE TO RELATED APPLICATIONS

This application is a U.S. National Phase of International Patent Application No. PCT/JP2019/040160 filed on Oct. 11, 2019, which claims priority benefit of Japanese Patent Application No. JP 2018-222011 filed in the Japan Patent Office on Nov. 28, 2018. Each of the above-referenced applications is hereby incorporated herein by reference in its entirety.

FIELD

The present disclosure relates to an elastic unit.

BACKGROUND

In recent years, the development of actuators for driving each of the parts of a robot device is also advancing with the progress in developing robot devices. As an example of such actuators, linear actuators that perform driving in a linear motion direction are known.

Linear actuators are capable of causing a motor which performs rotational movement, or the like, to generate thrust without using a mechanical transformation mechanism such as a gear, and are therefore highly anticipated as actuators that possess superior controllability.

For example, Patent Literature 1 below discloses a series elastic actuator in which an elastic unit is further provided between a force point and a linear-motion drive unit in order to stabilize force control of the linear actuator.

CITATION LIST

Patent Literature

Patent Literature 1: U.S. Pat. No. 5,650,704

SUMMARY

Technical Problem

However, the structure of the elastic unit provided between the force point and the linear-motion drive unit is not adequately investigated in the foregoing Patent Literature 1. Therefore, by further investigating the specific structure of the elastic unit used in the series elastic actuator, an elastic unit which is more lightweight and of superior maintainability can potentially be achieved.

Solution to Problem

According to the present disclosure, an elastic unit is provided that includes: a shaft-like member that extends in one direction and that is connected to a force point acted on by an external force; an enclosure member that has an internal space and that is penetrated by the shaft-like member; a bearing that is provided at a point of contact between the shaft-like member and the enclosure member so that the shaft-like member is movable with respect to the enclosure member; a plate member that is provided inside the internal space of the enclosure member so as to protrude from the shaft-like member; and at least one or more elastic members sandwiched between the enclosure member and the plate member.

DESCRIPTION OF EMBODIMENTS

A preferred embodiment of the present disclosure will be described in detail hereinbelow with reference to the appended drawings. Note that, in the present specification and drawings, redundant descriptions of components having substantially the same function configuration are omitted by assigning the same reference signs.

Note that the description will be given in the following order.

1. Overview of series elastic actuator
2. Structure of elastic unit
3. Modification examples
4. Applied example

1. Overview of Series Elastic Actuator

Figure 1:
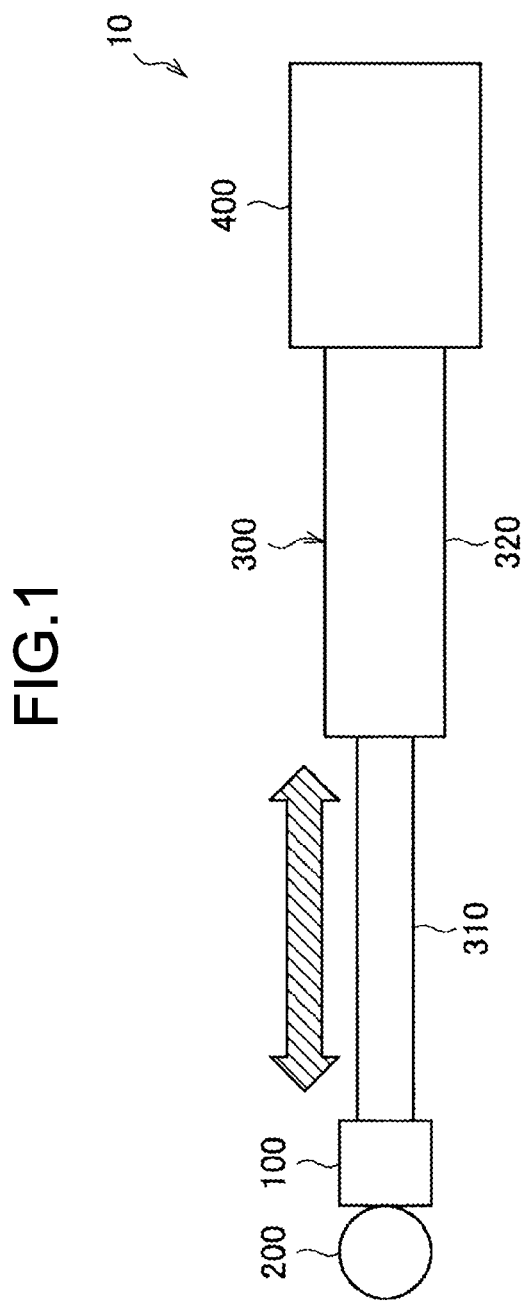
FIG. 1 is an explanatory diagram schematically illustrating an overview of a series elastic actuator.

First, an overview of the series elastic actuator to which the elastic unit according to a first embodiment of the present disclosure is applied will be described with reference to FIG. 1. FIG. 1 is an explanatory diagram schematically illustrating an overview of a series elastic actuator.

As illustrated in FIG. 1, a series elastic actuator 10 is provided with a force point 200, an elastic unit 100, a linear motion part 300, and a linear-motion drive unit 400, for example.

The linear-motion drive unit 400 is a drive device for generating motive power to move the linear motion part 300 in one direction. The linear-motion drive unit 400 may be any well-known drive device as long as same enables the linear motion part 300 to move in one direction, and may, for example, be a solenoid that transforms an electromagnetic force into linear motion, a power cylinder that transforms pressure such as hydraulic pressure, air pressure, or water pressure into linear motion, or a linear actuator that uses a linear motor, or the like. Alternatively, the linear-motion drive unit 400 may be a drive device with which rotational motion generated by a motor or the like is transformed to linear motion by means of a mechanical structure such as a gear or a ball screw.

The linear motion part 300 is a member that moves in one direction due to motive power from the linear-motion drive unit 400 and is provided connected to the linear-motion drive unit 400. More specifically, the linear motion part 300 may be configured from an expandable section 310 that expands in one direction due to the motive power from the linear-motion drive unit 400; and a storage section 320 that stores the expandable section 310 during expansion/compression. Note that the linear motion part 300 may be integrated with the linear-motion drive unit 400.

The elastic unit 100 is a member that is provided between the linear motion part 300 and the force point 200 and that absorbs, using an elastic force, an external force applied to the force point 200. The elastic unit 100 is capable of preventing an external force (that is, a shock or the like) applied to the force point 200 from being directly transmitted to the linear motion part 300, and hence the linear motion part 300 can be protected from a shock or the like applied to the force point 200.

Furthermore, the elastic unit 100 is capable of transforming the energy of the external force applied to the force point 200 into elastic deformation energy, and therefore by measuring the magnitude of the elastic deformation resulting from the transformation, the size of the external force applied to the force point 200 can also be measured. In this case, the elastic unit 100 is capable of functioning as a force detection sensor.

The force point 200 is a member that causes a force to act externally due to the driving of the series elastic actuator 10. Therefore, an external force acts on the force point 200 as an externally-acting counterforce. In the case of the series elastic actuator 10, the external force applied to the force point 200 is absorbed by the elastic unit 100, and hence damage to the linear motion part 300 or the linear-motion drive unit 400 caused by the external force can be mitigated.

There are no particular limitations on the structure of the force point 200, rather, same may be a rotation bearing that enables connection of a member that rotatably turns about the force point 200, for example. In such a case, the series elastic actuator 10 is capable of transforming the linear motion of the force point 200 into rotational motion, and hence is capable of functioning as an actuator that rotates a joint of an arm section or a leg section of a robot device.

The technology according to the present disclosure is applied to a series elastic actuator 10 in which the elastic unit 100 is provided between the force point 200 and the linear-motion drive unit 400 as mentioned earlier. According to the technology of the present disclosure, it is possible to provide the elastic unit 100 with a more lightweight and robust structure. The elastic unit 100 according to the first embodiment of the present disclosure will be described hereinbelow in more specific terms.

2. Structure of Elastic Unit

Figure 2:
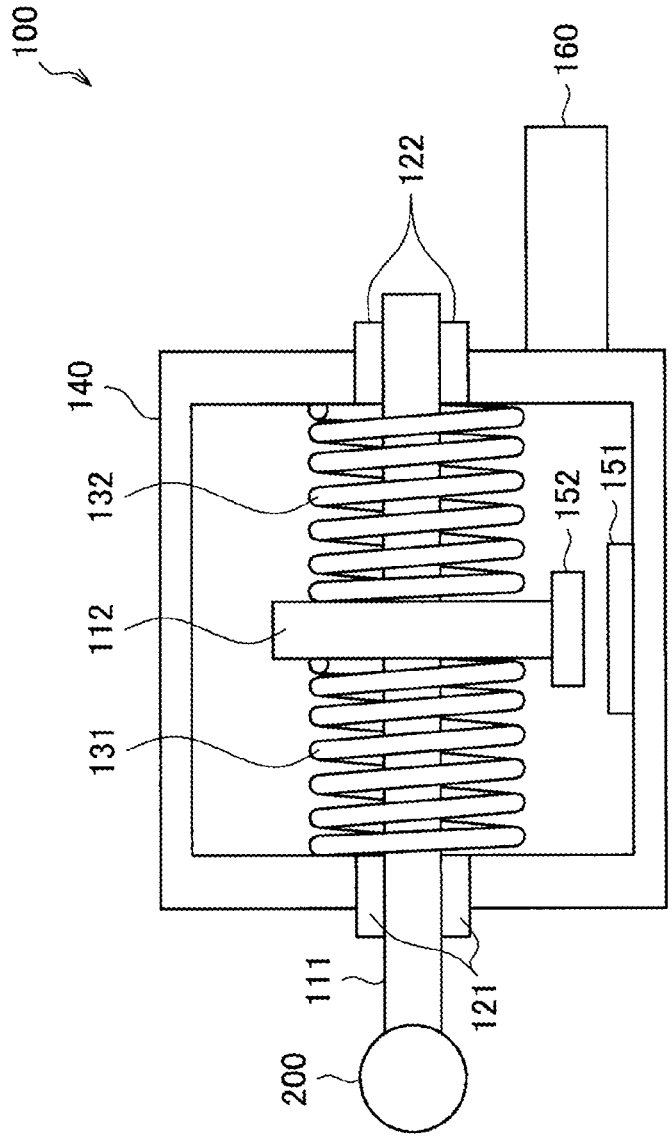
FIG. 2 is a schematic diagram illustrating the structure of an elastic unit according to a first embodiment of the present disclosure.

Next, the structure of the elastic unit 100 according to the present embodiment will be described with reference to FIG. 2. FIG. 2 is a schematic diagram illustrating the structure of the elastic unit 100 according to the present embodiment.

As illustrated in FIG. 2, the elastic unit 100 is provided with a shaft-like member 111, an enclosure member 140, bearings 121, 122, a plate member 112, elastic members 131, 132, an encoder detection unit 151, an encoder unit 152, and a connecting portion 160.

The shaft-like member 111 is a member that is connected to the force point 200 and that extends like a shaft in one direction. The shaft-like member 111 is provided so as to penetrate the enclosure member 140 (described subsequently), and is provided so as to be movable by the bearings 121, 122 with respect to the enclosure member 140. Thus, the shaft-like member 111 is capable of moving independently of the enclosure member 140 due to an external force applied to the force point 200. Therefore, the direction of extension of the shaft-like member 111 is the detection direction of the external force applied to the force point 200.

Note that a stopper (not illustrated) may also be provided at the other end of the shaft-like member 111 on the opposite side from the one end where the force point 200 is provided. The stopper comes into contact with the bearing 122 or the enclosure member 140 when the shaft-like member 111 moves excessively due to the external force applied to the force point 200, thereby preventing further movement of the shaft-like member 111. Thus, the stopper is capable of preventing an excessive load on the elastic unit 100 due to the external force applied to the force point 200.

The enclosure member 140 is a member that has an internal space and that stores, in the internal space, the principal members of the elastic unit 100. The shape of the enclosure member 140 may be a cylindrical shape or a prism shape the height direction of which is the direction of extension of the shaft-like member 111, for example, or may be an isotropic shape such as a spherical shape or polyhedral shape. As described earlier, the shaft-like member 111 is provided so as to penetrate the enclosure member 140 via the bearings 121, 122.

The bearings 121, 122 are each provided at a point of contact between the shaft-like member 111 and the enclosure member 140 and support the shaft-like member 111 so that same is movable with respect to the enclosure member 140. More specifically, the bearing 121 is provided on the surface of the enclosure member 140 on the side where the force point 200 is provided, and the bearing 122 is provided on the surface of the enclosure member 140 on the opposite side from the side where the force point 200 is provided.

The bearings 121, 122 function as radial bearings that support the load of the shaft-like member 111 that performs a reciprocating motion in one direction due to the external force applied to the force point 200. The structure of the bearings 121, 122 may be any kind of structure as long as same enables the shaft-like member 111 to move with respect to the enclosure member 140, and may be any structure, namely, that of a rolling bearing, a slide bearing, a magnetic bearing, or a fluid bearing.

The elastic unit 100 according to the present embodiment is capable of extending the distance between the bearings 121, 122 without increasing the size of the elastic unit 100 (that is, the width of the elastic unit 100) that is oriented orthogonal to the direction in which the external force acts. Thus, the elastic unit 100 according to the present embodiment enables a structure which is more robust with respect to the moment load due to the external force applied to the force point 200 to be realized.

The plate member 112 is a member that is provided inside the internal space of the enclosure member 140 so as to protrude from the shaft-like member 111. More specifically, the plate member 112 may be a disc-shaped or prism-shaped member that orthogonally intersects the direction of extension of the shaft-like member 111. The plate member 112 moves in conjunction with the shaft-like member 111 due to the external force applied to the force point 200, thereby extending/compressing the elastic members 131, 132 sandwiched between the plate member 112 and the enclosure member 140. Thus, the elastic unit 100 is capable of transforming the energy of the external force applied to the force point 200 into elastic deformation energy of the elastic members 131, 132.

The elastic members 131, 132 are members that are elastically deformable in the direction of extension of the shaft-like member 111 and are provided sandwiched between the plate member 112 and the enclosure member 140. More specifically, the elastic members 131, 132 are each provided on the two main surfaces of the plate member 112. For example, the elastic member 131 may be provided on the main surface of the plate member 112 on the side where the force point 200 is provided, and the elastic member 132 may be provided on the main surface of the plate member 112 on the opposite side from the side where the force point 200 is provided. Note that the moduli of elasticity of the elastic members 131, 132 (the spring constants in the case of coil springs) may be the same as each other or may be different from each other.

Here, the elastic members 131, 132 may be hollow-shaped so as to surround the periphery of the shaft-like member 111. Accordingly, the elastic members 131, 132 enable the shaft-like member 111 to be arranged in the internal space, and hence the elastic unit 100 can be further miniaturized due to more effective utilization of the space between the elastic members and the shaft-like member 111. For example, the elastic members 131, 132 are coil springs, and the shaft-like member 111 may be provided so as to penetrate the center of the helical shape of the coil springs. Thus, the elastic members 131, 132 enable the space between the elastic members and the shaft-like member 111 to be utilized more effectively, and hence the elastic unit 100 can be further miniaturized.

Note that, as long as the elastic members 131, 132 are members that can be elastically deformed in the direction of extension of the shaft-like member 111, it is understood that the elastic members may be members other than coil springs. For example, the elastic members 131, 132 may be a multilayered wave ring, a rubber or elastomeric material, or a jamming structural body, or the like. Even when the elastic members 131, 132 are such members, the elastic members 131, 132 are arranged so as to surround the periphery of the shaft-like member 111, thereby enabling the elastic unit 100 to be further miniaturized.

The encoder detection unit 151 and the encoder unit 152 detect the motion amounts of the shaft-like member 111 and plate member 112 with respect to the enclosure member 140. More specifically, the encoder detection unit 151 and the encoder unit 152 are so-called optical linear encoders that detect the motion amount of the plate member 112 with respect to the enclosure member 140. For example, the encoder unit 152 is a grass substrate formed with an evenly spaced grid scale, and may be provided on the edge of the plate member 112. Furthermore, the encoder detection unit 151 is a light detection device that projects light onto the encoder unit 152 from a predetermined position and that detects reflected light from the encoder unit 152, and may be provided on the internal space side of the enclosure member 140 so as to lie opposite the encoder unit 152.

Accordingly, because the amount of reflected light changes due to the grid scale of the encoder unit 152, the encoder detection unit 151 detects the amount by which the reflected light from the encoder unit 152 changes, thus making it possible to detect how much of the grid scale of the encoder unit 152 has passed the light projection position. Therefore, the encoder detection unit 151 and the encoder unit 152 are capable of detecting the motion amount of the plate member 112 with respect to the enclosure member 140. The motion amount of the plate member 112 with respect to the enclosure member 140 measured by the encoder detection unit 151 and the encoder unit 152 can be used to derive the size of the external force applied to the force point 200, for example.

The connecting portion 160 is a member that is provided on the side of the enclosure member 140 opposite the side where the force point 200 is provided, and that connects the elastic unit 100 to the linear motion part 300 or the linear-motion drive unit 400. There are no particular limitations on the shape or installation position of the connecting portion 160 as long as same enables the elastic unit 100 to be connected to the linear motion part 300 or the linear-motion drive unit 400.

The elastic unit 100 according to the present embodiment has a structure which is connected directly to the linear motion part 300 by the connecting portion 160. Thus, the elastic unit 100 is capable of facilitating connection to or removal from the linear motion part 300 or the linear-motion drive unit 400, and hence the mass productivity and maintainability of the series elastic actuator 10 can be improved.

Figure 3:
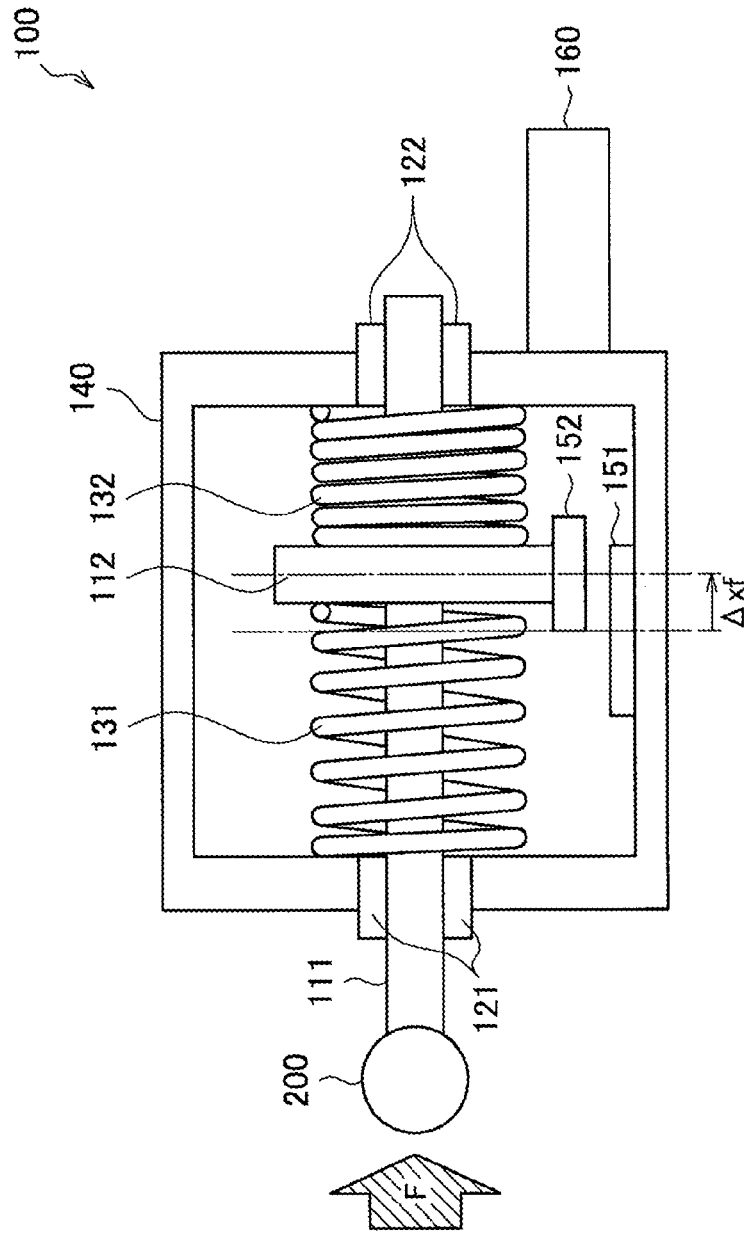
FIG. 3 is a schematic diagram illustrating the operation of the elastic unit when an external force is applied to a force point.

The operation of the elastic unit 100 when an external force is applied to the force point 200 will be described next with reference to FIG. 3. FIG. 3 is a schematic diagram illustrating the operation of the elastic unit 100 when an external force is applied to the force point 200.

As illustrated in FIG. 3, when an external force F is applied to the force point 200, the shaft-like member 111 connected to the force point 200 and the plate member 112 protruding from the shaft-like member 111 are pushed in in the direction of extension of the shaft-like member 111. Thus, one of the elastic members 131, 132 between the pushed-in plate member 112 and the fixed enclosure member 140 is expanded, while the other of the elastic members is compressed.

Here, the elastic members 131, 132 are coil springs, and the respective spring constants thereof are k1 and k2, respectively. When the direction in which the external force F acts is the same as the direction of extension of the shaft-like member 111, the whole of the external force F is dissipated in elastically deforming the elastic members 131, 132, and the elastic members 131, 132 are in a state of being expanded or compressed, respectively, from a natural length state. Supposing that the motion amount of the plate member 112 from a case where the elastic members 131, 132 are in an unloaded state is Δxf, the relationship of equation 1 below is established between the external force F and the motion amount Δxf of the plate member 112.

$$F = (k1 + k2) \cdot \Delta xf \qquad \text{Equation 1}$$

Hence, the motion amount Δxf of the plate member 112 can be measured by the encoder detection unit 151 and the encoder unit 152, and it is possible to calculate the magnitude of the external force F applied to the force point 200 by performing a calculation using the spring constants k1 and k2 of the elastic members 131, 132 set at the design stage. Thus, the elastic unit 100 is capable of causing the series elastic actuator 10 to execute highly accurate force control or damping control by feeding back the calculated external force F and motion amount Δxf to the linear-motion drive unit 400 or the like.

Figure 4:
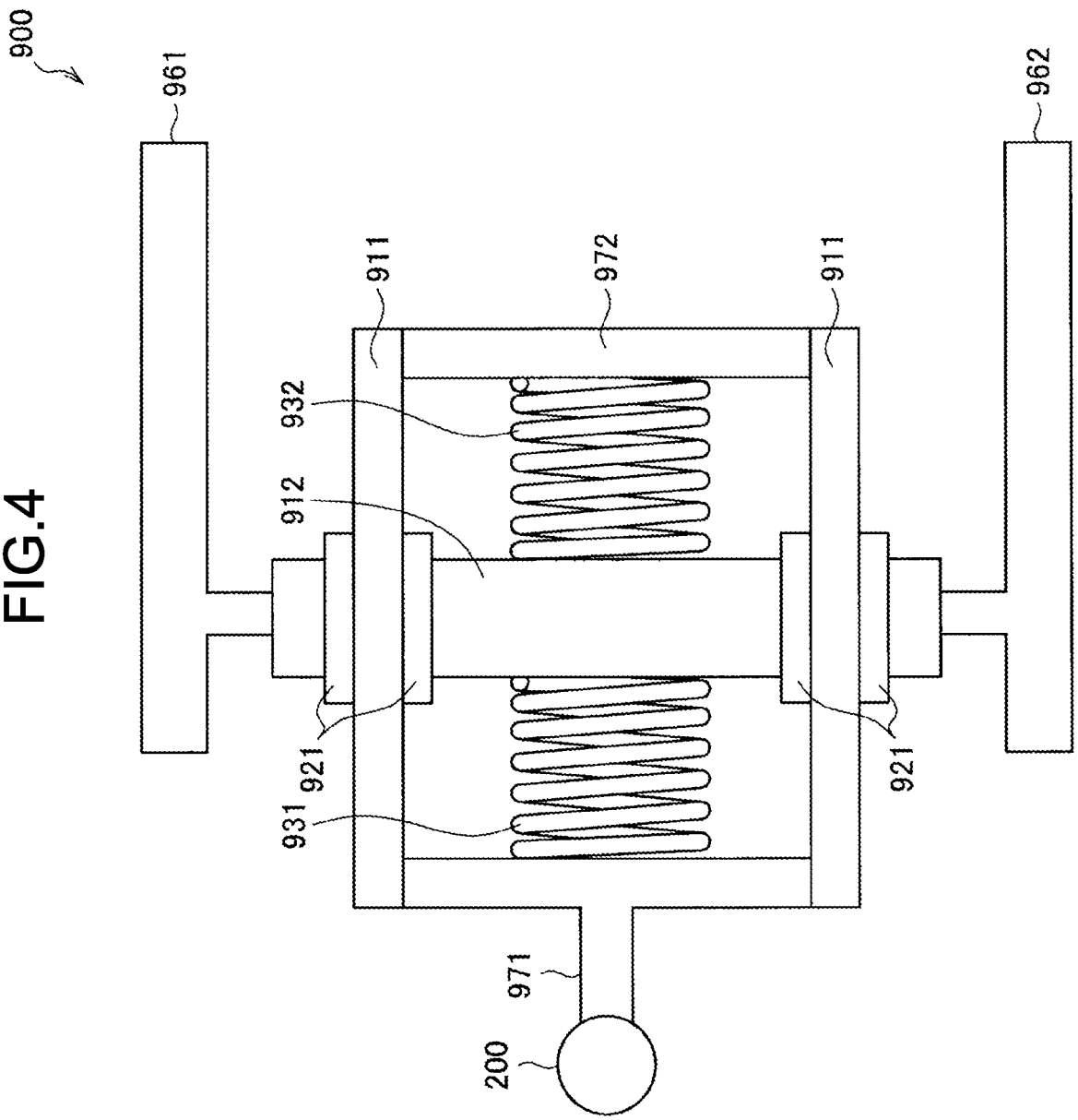
FIG. 4 is a schematic diagram illustrating the structure of an elastic unit according to a comparative example.

Next, the superiority of the elastic unit 100 according to the present embodiment will be described by referring to the structure of an elastic unit 900 according to the comparative example illustrated in FIG. 4. FIG. 4 is a schematic diagram illustrating the structure of the elastic unit 900 according to the comparative example.

As illustrated in FIG. 4, the elastic unit 900 according to the comparative example is provided with a force point 200, a bearing plate 971, linear motion shafts 911, a bottom plate 972, bearings 921, a plate member 912, elastic members 931, 932, and connecting portions 961, 961, for example.

The linear motion shafts 911 are respectively provided in the direction in which the external force from the force point 200 acts, and are coupled to each other by the bearing plate 971 connected to the force point 200, and by the bottom plate 972. The linear motion shafts 911 are provided so as to penetrate the plate member 912 (described subsequently), and are provided so as to be movable with respect to the plate member 912 due to the bearings 921. Thus, the linear motion shafts 911, the bearing plate 971, and the bottom plate 972 are capable of moving independently of the plate member 912 due to the external force applied to the force point 200.

The bearings 921 are each provided at a point of contact between the linear motion shafts 911 and the plate member 912 and support the linear motion shafts 911 such that same are movable with respect to the plate member 912. That is, the bearings 921 function as radial bearings that support the load of the linear motion shafts 911 that perform a reciprocating motion in one direction due to the external force applied to the force point 200.

The plate member 912 is penetrated by the linear motion shafts 911 via the bearings 921 and is provided parallel to the bearing plate 971 and plate member 912. Furthermore, elastic members 931, 932, which are elastically deformable in the direction of extension of the linear motion shafts 911, are respectively provided sandwiched between the plate member 912, and the bearing plate 971 and the plate member 912.

The connecting portions 961, 962 are respectively provided on the two sides of the plate member 912 so as to sandwich the plate member 912 therebetween, and connects the elastic unit 900 to the linear motion part 300 or the linear-motion drive unit 400. In the case of the elastic unit 900, the linear motion shafts 911, the bearing plate 971, and the bottom plate 972 are capable of moving as a result of an external force being applied to the force point 200. Hence, the connecting portions 961, 962, which connect the elastic unit 900 to the linear motion part 300 or linear-motion drive unit 400, are connected to the plate member 912 which is not movable even when an external force is applied to the force point 200.

In the case of the elastic unit 900 according to the comparative example, when an external force is applied to the force point 200, the bearing plate 971 connected to the force point 200, the linear motion shafts 911, and the bottom plate 972 are pushed in in the direction of extension of the linear motion shafts 911. Due to this configuration, one of the elastic members 931, 932, which is between the pushed in the bearing plate 971 and the bottom plate 972, and the fixed plate member 912, is compressed, while the other of the elastic members is expanded. Thus, the elastic unit 900 according to the comparative example is capable of transforming the energy of the external force applied to the force point 200 into elastic deformation energy of the elastic members 931, 932. Furthermore, by detecting the motion amount of the bearing plate 971 and the bottom plate 972 with respect to the plate member 912, the elastic unit 900 according to the comparative example is capable of calculating the magnitude of the external force applied to the force point 200.

Nevertheless, in the case of the elastic unit 900 according to the comparative example, the bearings 921 movably supporting the linear motion shafts 911 are arranged in a direction orthogonally intersecting the direction in which external force acts. Hence, when the distance between the bearings 921 is extended in order to improve the robustness to a moment load exerted by the external force applied to the force point 200, the size of the elastic unit 900 in a direction orthogonally intersecting the direction in which the external force acts (that is, the width of the elastic unit 900) then increases.

Additionally, in the case of the elastic unit 900 according to the comparative example, because the connecting portions 961, 962 are connected to the lateral surfaces of the plate member 912, the width of the elastic unit 900 is further increased by the connecting portions 961, 962. Moreover, in the case of the elastic unit 900, because a connection is formed between the elastic unit 900 and the linear motion part 300 or linear-motion drive unit 400 due to the plate member 912 being sandwiched between the connecting portions 961, 962, this connection cannot easily be broken. Hence, the series elastic actuator 10 using the elastic unit 900 according to the comparative example exhibits reduced mass productivity and maintainability.

As can be seen when referring to the elastic unit 900 according to the comparative example, despite the elastic unit 100 according to the present embodiment having a smaller width and being more compact, the elastic unit 100 is capable of exhibiting improved robustness to a moment load on the force point 200. Moreover, the elastic unit 100 according to the present embodiment enables the connection with the linear motion part 300 or linear-motion drive unit 400 to be formed using a simpler structure. Thus, the elastic unit 100 according to the present embodiment enables improvements in the mass productivity and maintainability of the series elastic actuator 10.

3. Modification Examples

Modification examples of the elastic unit 100 according to the present embodiment will be described hereinbelow with reference to FIGS. 5 to 10.

First Modification Example

Figure 5:
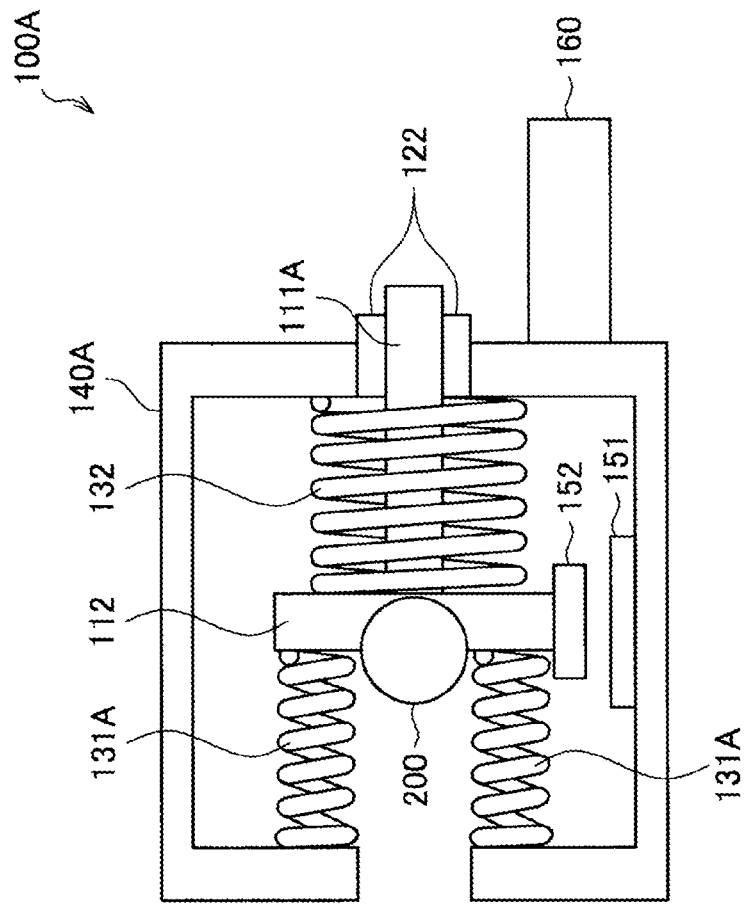
FIG. 5 is a schematic diagram illustrating the structure of an elastic unit according to a first modification example.

First, the structure of an elastic unit 100A according to a first modification example will be described with reference to FIG. 5. FIG. 5 is a schematic diagram illustrating the structure of the elastic unit 100A according to the first modification example.

As illustrated in FIG. 5, the elastic unit 100A is provided with a shaft-like member 111A, an enclosure member 140A, bearings 122, a plate member 112, elastic members 131A, 132, an encoder detection unit 151, an encoder unit 152, and a connecting portion 160. The configuration, to which the same reference signs as in FIG. 2 are assigned, is substantially the same as the configuration described with reference to FIG. 2, and hence a description thereof is omitted here.

The elastic unit 100A according to the first modification example differs from the elastic unit 100 illustrated in FIG. 2 in that the force point 200 exists in an internal space of the enclosure member 140A.

More specifically, the force point 200 is provided connected to the plate member 112, and the shaft-like member 111A is connected to the force point 200 via the plate member 112. Furthermore, in order to enable an external force to act on the force point 200, an opening is provided in one surface of the enclosure member 140A, and the elastic members 131A are configured from a plurality of coil springs, and each arranged in the vicinity of the force point 200.

In the case of the elastic unit 100A according to the first modification example, the length of the shaft-like member 111A connected to the force point 200 can be made shorter, and therefore the moment load acting on the shaft-like member 111A from the force point 200 can be further reduced.

Note that, although coil springs are illustrated in FIG. 5 as the elastic members 131A, 132, the elastic members 131A, 132 are not limited to or by this example. As mentioned earlier, it is understood that the elastic members 131A, 132 may be an elastic member such as a multilayered wave ring, or a rubber or elastomeric material.

Second Modification Example

Figure 6:
FIG. 6 is a block diagram illustrating a function configuration for changing the elastic modulus of the elastic unit according to a second modification example.

Next, an elastic unit 100B according to a second modification example will be described with reference to FIG. 6. FIG. 6 is a block diagram illustrating a function configuration for changing the elastic modulus of the elastic unit 100B according to the second modification example.

In the case of the elastic unit 100B according to the second modification example, the elastic members 131, 132 are provided using jamming structural bodies. A jamming structural body is a structural body that, by utilizing the jamming transitions of powder particles, enables control of an elastic modulus according to the clogging of the powder particles. Hence, the elastic unit 100B controls the internal pressure of the internal space of the enclosure member 140 and enables the elastic modulus of the elastic members 131, 132 to be changed by changing the clogging of powder particles of elastic members 131, 132 which are jamming structural bodies.

More specifically, a regulator 20 is a valve for pressure adjustment, and a compressor 30 is a compressor for pumping a gas. The elastic unit 100B according to the second modification example feeds, via the regulator 20, a gas which has been compressed by the compressor 30 into the interior of the enclosure member 140, and is thus capable of controlling the internal pressure of the internal space of the enclosure member 140 and of controlling the elastic modulus of the elastic members 131, 132.

Third Modification Example

Figure 7:
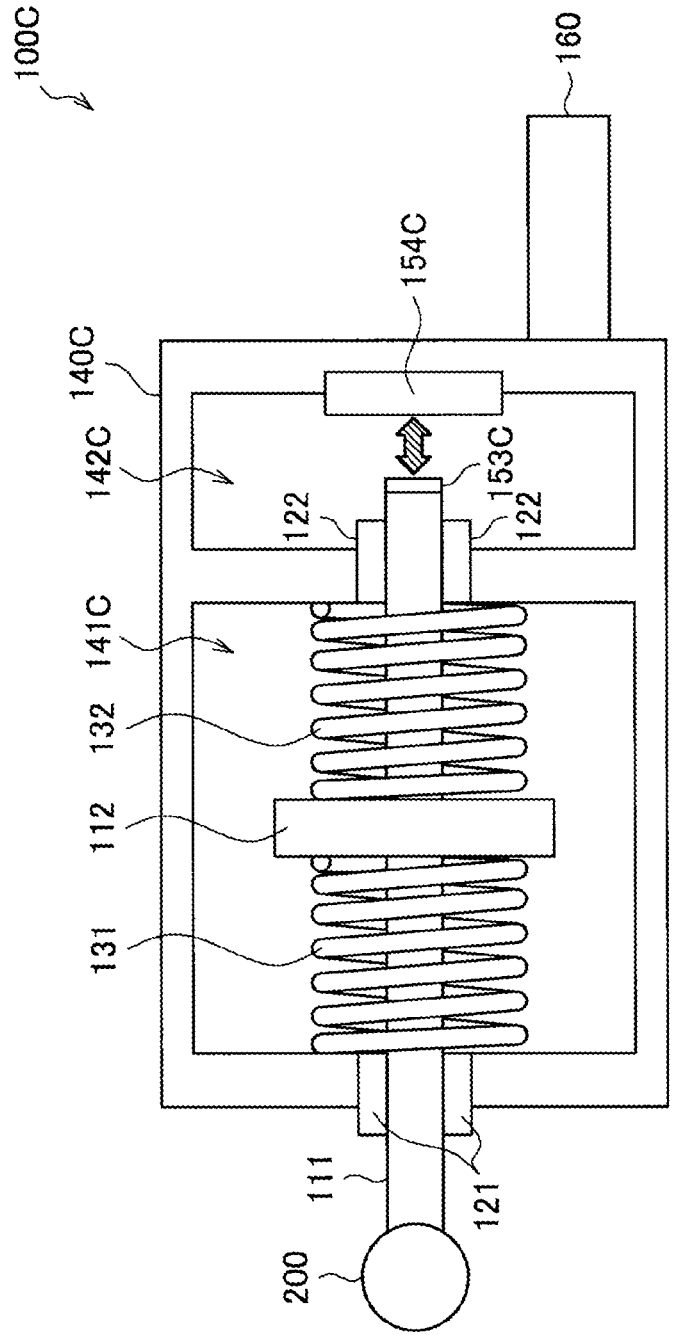
FIG. 7 is a schematic diagram illustrating the structure of an elastic unit according to a third modification example.

Next, the structure of an elastic unit 100C according to a third modification example will be described with reference to FIG. 7. FIG. 7 is a schematic diagram illustrating the structure of the elastic unit 100C according to the third modification example.

As illustrated in FIG. 7, the elastic unit 100C is provided with a shaft-like member 111, an enclosure member 140C, bearings 121, 122, a plate member 112, elastic members 131, 132, a reflective plate 153C, a ranging sensor 154C, and a connecting portion 160. The configuration, to which the same reference signs as in FIG. 2 are assigned, is substantially the same as the configuration described with reference to FIG. 2, and hence a description thereof is omitted here.

The elastic unit 100C according to the third modification example differs from the elastic unit 100 illustrated in FIG. 2 in that the motion amounts of the shaft-like member 111 and plate member 112 with respect to the enclosure member 140C are detected by the reflective plate 153C and the ranging sensor 154C.

More specifically, the enclosure member 140C is provided, on the other end side of the shaft-like member 111, with an internal space 142C inside which the ranging sensor 154C is provided, in addition to the internal space 141C inside which the shaft-like member 111, the plate member 112, and the elastic members 131, 132 are provided. The ranging sensor 154C is a sensor that measures the distance from the other end of the shaft-like member 111. For example, the ranging sensor 154C may project light onto the reflective plate 153C provided at the other end of the shaft-like member 111 and measure the distance from the other end of the shaft-like member 111 on the basis of the time taken for the projected light to be reflected by the reflective plate 153C and to return.

In the case of the elastic unit 100C according to the third modification example, although the measurement accuracy is lower than that of an optical linear encoder, the motion amounts of the shaft-like member 111 and plate member 112 can be detected by a lower-cost ranging sensor 154C. Thus, the elastic unit 100C according to the third modification example enables a reduction in the manufacturing costs of the series elastic actuator 10.

Fourth Modification Example

Figure 8:
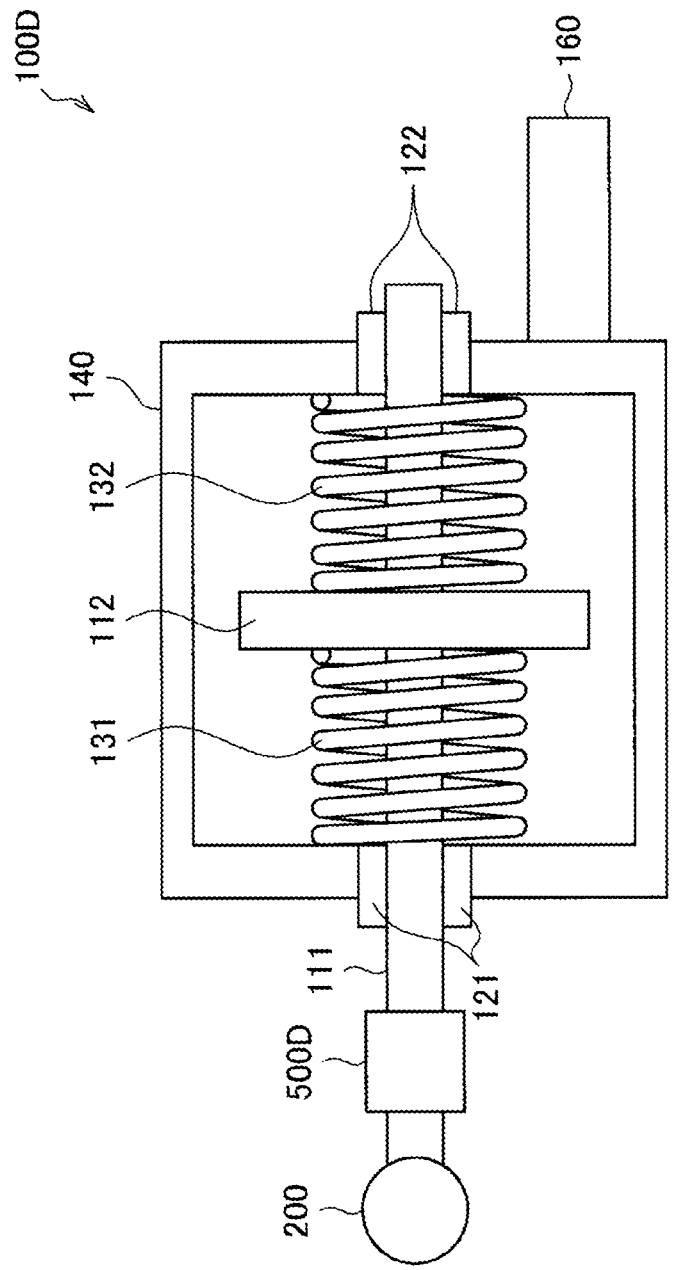
FIG. 8 is a schematic diagram illustrating the structure of an elastic unit according to a fourth modification example.

Next, the structure of an elastic unit 100D according to a fourth modification example will be described with reference to FIG. 8. FIG. 8 is a schematic diagram illustrating the structure of the elastic unit 100D according to the fourth modification example.

As illustrated in FIG. 8, the elastic unit 100D is provided with a shaft-like member 111, an enclosure member 140, bearings 121, 122, a plate member 112, elastic members 131, 132, a force detection sensor 500D, and a connecting portion 160. The configuration, to which the same reference signs as in FIG. 2 are assigned, is substantially the same as the configuration described with reference to FIG. 2, and hence a description thereof is omitted here.

The elastic unit 100D according to the fourth modification example differs from the elastic unit 100 illustrated in FIG. 2 in that the shaft-like member 111 is provided with the force detection sensor 500D, which detects the magnitude of the external force applied to the force point 200. The force detection sensor 500D is a force sensor that uses a strain gauge, for example, and is capable of directly measuring the magnitude of the external force applied to the force point 200.

The elastic unit 100D according to the fourth modification example is capable of directly measuring the magnitude of the external force applied to the force point 200 without the involvement of the elastic members 131, 132. Accordingly, the elastic unit 100D is capable of measuring the magnitude of the external force applied to the force point 200 without damage caused by friction or the like, and therefore enables the force detection accuracy to be improved. Furthermore, because the elastic unit 100D according to the fourth modification example enables shocks applied to the force point 200 to be absorbed by the elastic members 131, 132, the probability of damage to the force detection sensor 500D, which is vulnerable to shocks, can be reduced.

Fifth Modification Example

Figure 9:
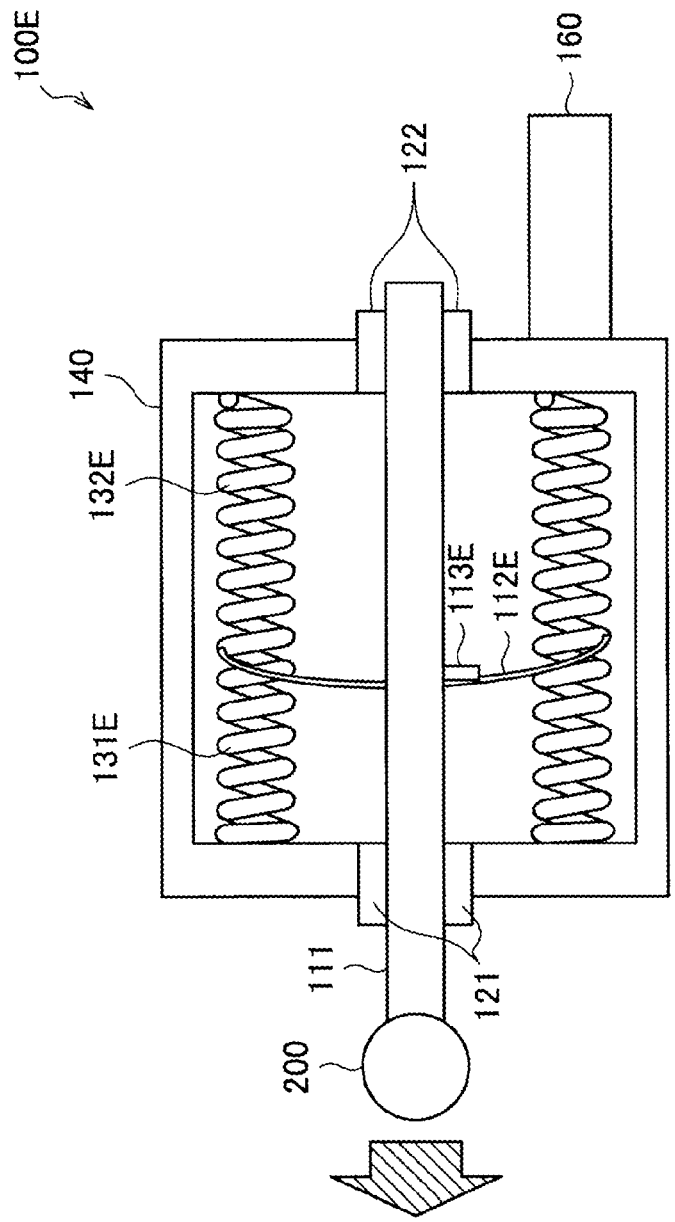
FIG. 9 is a schematic diagram illustrating the structure of an elastic unit according to a fifth modification example.

Next, the structure of an elastic unit 100E according to a fifth modification example will be described with reference to FIG. 9. FIG. 9 is a schematic diagram illustrating the structure of the elastic unit 100E according to the fifth modification example.

As illustrated in FIG. 9, the elastic unit 100E is provided with a shaft-like member 111, an enclosure member 140, bearings 121, 122, a plate member 112E, elastic members 131E, 132E, a strain sensor 113E, and a connecting portion 160. The configuration, to which the same reference signs as in FIG. 2 are assigned, is substantially the same as the configuration described with reference to FIG. 2, and hence a description thereof is omitted here.

The elastic unit 100E according to the fifth modification example differs in that the plate member 112E is flexible and in that the magnitude of the external force applied to the force point 200 is calculated by using the strain sensor 113E to detect the amount of bending of the plate member 112E.

More specifically, the plate member 112E is flexible due to being formed with a thin structure or due to being formed from a flexible material such as plastic. Thus, when an external force is applied to the force point 200, the plate member 112E then bends as the shaft-like member 111 moves and without elastically deforming the elastic members 131E, 132E. Hence, by using the strain sensor 113E, which is a strain gauge or the like, the magnitude of the external force applied to the force point 200 can be calculated by detecting the amount of bending of the plate member 112E. Note that, in the case of the elastic unit 100E according to the fifth modification example, the elastic members 131E, 132E are not provided in order to detect the magnitude of the external force, rather, same are provided in order to absorb shocks applied to the force point 200.

The elastic unit 100E according to the fifth modification example employs the plate member 112E, which is flexible, and the strain sensor 113E, and is thus capable, even with a more compact configuration, of detecting the magnitude of the external force applied to the force point 200. Furthermore, the elastic unit 100E according to the fifth modification example utilizes the bending of the plate member 112E to enable detection of the magnitude of the external force applied to the force point 200 without considering hysteresis of the elastic members 131E, 132E.

Sixth Modification Example

Figure 10:
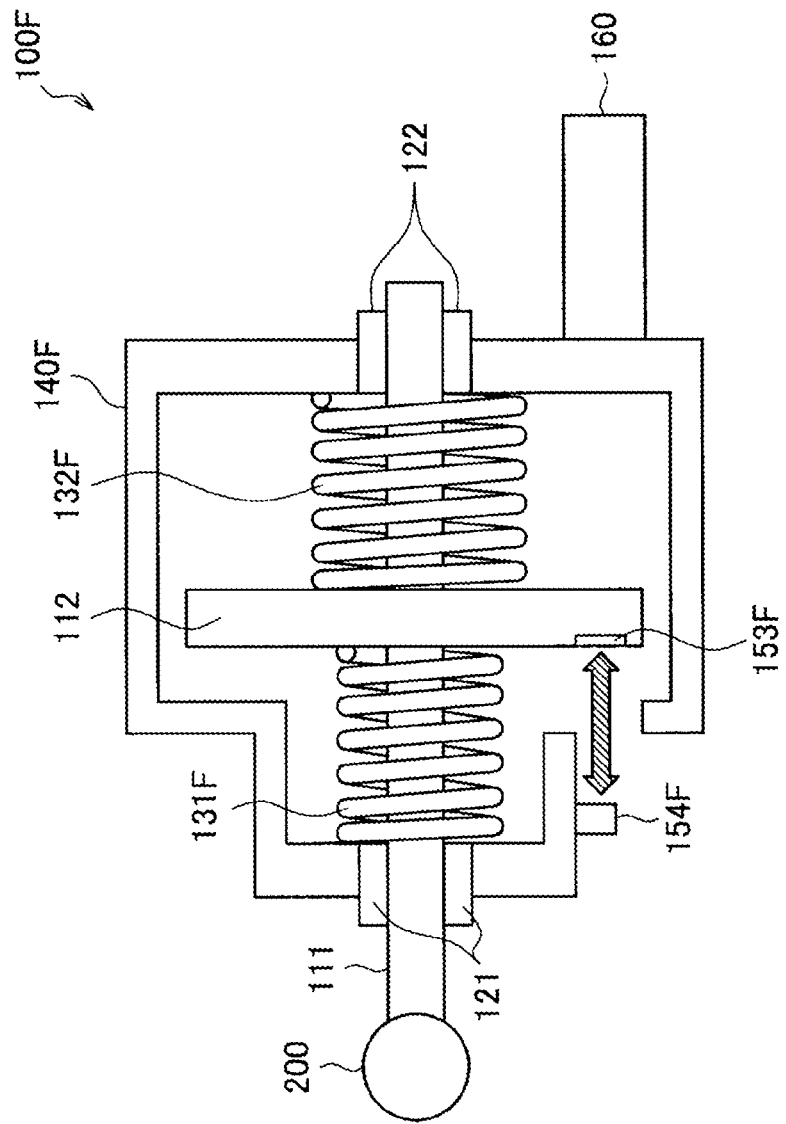
FIG. 10 is a schematic diagram illustrating the structure of an elastic unit according to a sixth modification example.

Next, the structure of an elastic unit 100F according to a sixth modification example will be described with reference to FIG. 10. FIG. 10 is a schematic diagram illustrating the structure of the elastic unit 100F according to the sixth modification example.

As illustrated in FIG. 10, the elastic unit 100F is provided with a shaft-like member 111, an enclosure member 140F, bearings 121, 122, a plate member 112, elastic members 131F, 132F, a reflective plate 153F, a ranging sensor 154F, and a connecting portion 160. The configuration, to which the same reference signs as in FIG. 2 are assigned, is substantially the same as the configuration described with reference to FIG. 2, and hence a description thereof is omitted here.

The elastic unit 100F according to the sixth modification example differs from the elastic unit 100 illustrated in FIG. 2 in that the elastic members 131F, 132F differ from each other in size and in that the reflective plate 153F and the ranging sensor 154F are provided in a space amounting to the difference in size of the elastic members 131F, 132F.

More specifically, the elastic members 131F, 132F have mutually different elastic moduli and therefore differ from each other in size. Hence, an empty space due to miniaturization of the elastic member 131F is formed around the elastic member 131F, which is smaller in size than the elastic member 132F. In the elastic unit 100F according to the sixth modification example, the motion amounts of the shaft-like member 111 and plate member 112 are detected by providing the ranging sensor 154F on the enclosure member 140F-side of the empty space and by providing the reflective plate 153F on the plate member 112-side. For example, the ranging sensor 154F projects light onto the reflective plate 153F provided on one main side of the plate member 112 and is capable of measuring the distance from the plate member 112 on the basis of the time taken for the projected light to be reflected by the reflective plate 153F and to return.

In the elastic unit 100F according to the sixth modification example, the size of either of the elastic members 131F, 132F can be miniaturized, thereby enabling the elastic unit 100F to be further miniaturized. Furthermore, in the case of the elastic unit 100F according to the sixth modification example, although the measurement accuracy is lower than that of an optical linear encoder, the motion amounts of the shaft-like member 111 and plate member 112 can be detected by a lower-cost ranging sensor 154F. Thus, the elastic unit 100F according to the sixth modification example enables a reduction in the manufacturing costs of the series elastic actuator 10.

4. Applied Example

Figure 11:
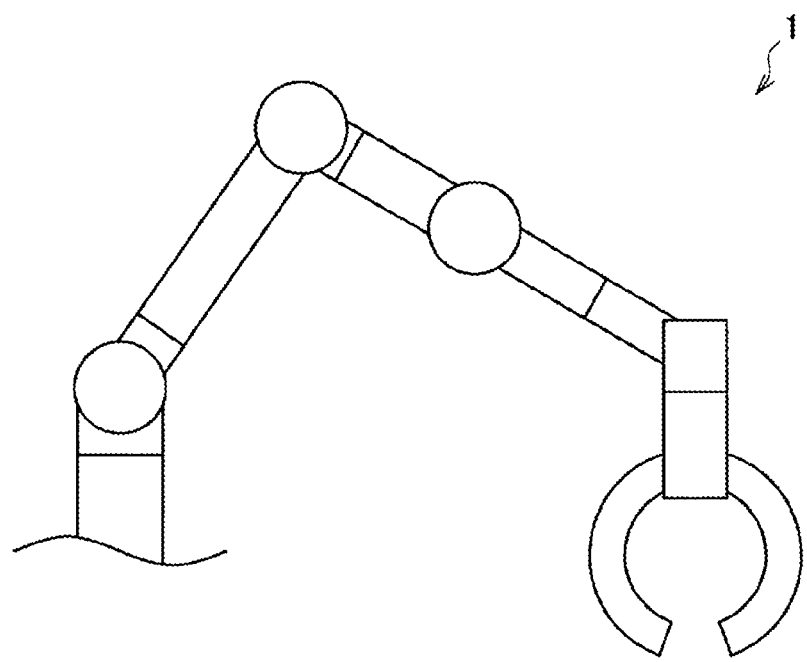
FIG. 11 is a schematic diagram illustrating a robot device to which the elastic unit or series elastic actuator according to the first embodiment of the present disclosure is applied.

Next, an applied example of the elastic unit 100 or the series elastic actuator 10 according to the present embodiment will be described with reference to FIG. 11. FIG. 11 is a schematic diagram illustrating a robot device 1 to which the elastic unit 100 or the series elastic actuator 10 according to the present embodiment is applied.

The elastic unit 100 or the series elastic actuator 10 according to the present embodiment may be applied to a multi-joint link mechanism of an articulated arm mechanism of a robot device like that illustrated in FIG. 11, for example.

More specifically, the series elastic actuator 10 may be applied to a drive unit for driving the joints of a multi-joint link mechanism. Furthermore, the elastic unit 100 may be applied to a shock absorbing part or a force detection unit provided in the links of a multi-joint link mechanism.

Moreover, the elastic unit 100 or the series elastic actuator 10 according to the present embodiment may also be applied to a multi-joint link mechanism for the legs of a legged robot device.

Although preferred embodiments of the present disclosure have been described in detail hereinabove with reference to the accompanying drawings, the technical scope of the present disclosure is not limited to or by such examples. It will be apparent to a person having ordinary knowledge in the technical field of the present disclosure that various modification or revision examples are conceivable within the scope of the technical ideas described in the claims and that such modification or revision examples are naturally understood to fall within the technical scope of the present disclosure.

Furthermore, the effects described in the present specification are merely illustrative or exemplary and are not restrictive. That is, the technology according to the present disclosure can afford other advantageous effects that would be apparent to a person skilled in the art from the description of the present specification in addition to or instead of the foregoing advantageous effects.

Note that the following configurations also belong to the technical scope of the present disclosure.

(1)
An elastic unit, comprising:
a shaft-like member that extends in one direction and that is connected to a force point acted on by an external force;
an enclosure member that has an internal space and that is penetrated by the shaft-like member;
a bearing that is provided at a point of contact between the shaft-like member and the enclosure member so that the shaft-like member is movable with respect to the enclosure member;
a plate member that is provided inside the internal space of the enclosure member so as to protrude from the shaft-like member; and
at least one or more elastic members sandwiched between the enclosure member and the plate member.

(2)
The elastic unit according to (1),
wherein the elastic member is provided so as to surround the periphery of the shaft-like member.

(3)
The elastic unit according to (2),
wherein the elastic member is a coil spring, and
wherein the shaft-like member is provided so as to penetrate the center of the helical shape of the coil spring.

(4)
The elastic unit according to (2),
wherein the elastic member is a jamming structural body that enables the elastic modulus to fluctuate under the internal pressure of the internal space of the enclosure member.

(5)
The elastic unit according to any one of (1) to (4),
wherein the elastic member is provided respectively on the two main sides of the plate member.

(6)
The elastic unit according to (5),
wherein the elastic members provided respectively on the two main sides have mutually different elastic moduli.

(7)
The elastic unit according to any one of (1) to (6), further comprising:
a motion amount sensor that measures the motion amounts of the plate member and the shaft-like member with respect to the enclosure member.

(8)
The elastic unit according to (7),
wherein the motion amount sensor is an optical or magnetic linear encoder.

(9)
The elastic unit according to (7),
wherein the motion amount sensor is a ranging sensor that measures the distance between the plate member or the shaft-like member, and the enclosure member.

(10)
The elastic unit according to (7),
wherein the elastic unit calculates the magnitude of the external force applied to the force point on the basis of the motion amounts measured by the motion amount sensor.

(11)
The elastic unit according to any one of (1) to (6),
wherein the plate member further comprises: a strain sensor that is flexible and that detects bending of the plate member.

(12)
The elastic unit according to any one of (1) to (6), further comprising:
a force detection sensor that is provided to the shaft-like member and that detects the external force acting on the force point.

(13)
The elastic unit according to any one of (1) to (12),
wherein a stopper that limits the motion amount of the shaft-like member with respect to the enclosure member is provided at the other end of the shaft-like member on the opposite side from the one end where the force point is provided.

(14)
The elastic unit according to any one of (1) to (13),
wherein the force point is a rotation bearing to which a member that rotatably turns about the force point is connected.

(15)
The elastic unit according to any one of (1) to (14),
wherein the enclosure member is further provided with a linear-motion drive unit that linearly moves the enclosure member in the direction of extension of the shaft-like member.

REFERENCE SIGNS LIST

1 ROBOT DEVICE
10 SERIES ELASTIC ACTUATOR
20 REGULATOR
30 COMPRESSOR
100 ELASTIC UNIT
111 SHAFT-LIKE MEMBER
112 PLATE MEMBER
121, 122 BEARING
131, 132 ELASTIC MEMBER
140 ENCLOSURE MEMBER
151 ENCODER DETECTION UNIT
152 ENCODER UNIT
160 CONNECTING SECTION
200 FORCE POINT
300 LINEAR MOTION UNIT
310 EXPANDABLE SECTION
320 STORAGE SECTION
400 LINEAR-MOTION DRIVE UNIT

The invention claimed is:
1. An elastic unit, comprising:
a shaft member that extends in a direction and that is connected to a force point acted on by an external force;
an enclosure member that has an internal space and that is penetrated by the shaft member;
a bearing that is at a point of contact between the shaft member and the enclosure member so that the shaft member is movable with respect to the enclosure member;
a plate member inside the internal space of the enclosure member, wherein
the plate member protrudes from the shaft member,
the plate member comprises a strain sensor that is flexible, and
the strain sensor is configured to detect bending of the plate member;
a first elastic member between the enclosure member and the plate member; and
a motion amount sensor inside the internal space of the enclosure member, wherein the motion amount sensor is configured to measure a distance between one of the plate member and the enclosure member or the shaft member and the enclosure member.

2. The elastic unit according to claim 1, wherein the first elastic member surrounds a periphery of the shaft member.

3. The elastic unit according to claim 2, wherein
the first elastic member is a coil spring, and
the shaft member penetrates a center of a helical shape of the coil spring.

4. The elastic unit according to claim 2, wherein the first elastic member is a jamming structural body configured to enable an elastic modulus of the first elastic member to fluctuate under an internal pressure of the internal space of the enclosure member.

5. The elastic unit according to claim 1, further comprising a second elastic member, wherein
the first elastic member is on a first side of the plate member, and
the second elastic member is on a second side of the plate member.

6. The elastic unit according to claim 5, wherein the first elastic member and the second elastic member have mutually different elastic moduli.

7. The elastic unit according to claim 1, wherein the motion amount sensor is one of an optical linear encoder or a magnetic linear encoder.

8. The elastic unit according to claim 1, wherein the motion amount sensor is a ranging sensor.

9. The elastic unit according to claim 1, wherein the elastic unit is configured to calculate a magnitude of the external force based on the distance measured by the motion amount sensor.

10. The elastic unit according to claim 1, further comprising a force detection sensor in the shaft member, wherein the force detection sensor is configured to detect the external force that acts on the force point.

11. The elastic unit according to claim 1, further comprising a stopper configured to limit a motion amount of the shaft member, wherein
the force point is at a first end of the shaft member, and
the stopper is at a second end of the shaft member opposite to the first end.

12. The elastic unit according to claim 1, wherein the force point is a rotation bearing to which a member that rotatably turns about the force point is connected.

13. The elastic unit according to claim 1, wherein the enclosure member includes a linear-motion drive unit configured to linearly move the enclosure member in the direction in which the shaft member extends.

14. An elastic unit, comprising:
a shaft member that extends in a direction and that is connected to a force point acted on by an external force;
an enclosure member that has an internal space and that is penetrated by the shaft member;
a bearing that is at a point of contact between the shaft member and the enclosure member so that the shaft member is movable with respect to the enclosure member;
a plate member inside the internal space of the enclosure member, wherein
the plate member protrudes from the shaft member,
the plate member comprises a strain sensor that is flexible, and
the strain sensor is configured to detect bending of the plate member; and
at least one elastic member between the enclosure member and the plate member.

* * * * *